United States Patent

Longacre, Jr. et al.

[11] Patent Number: 5,942,741
[45] Date of Patent: Aug. 24, 1999

[54] APPARATUS FOR OPTIMIZING THROUGHPUT IN DECODED-OUTPUT SCANNERS AND METHOD OF USING SAME

[75] Inventors: Andrew Longacre, Jr., Skaneateles; Robert M. Hussey, Liverpool, both of N.Y.

[73] Assignee: Welch Allyn, Inc., Skaneateles Falls, N.Y.

[21] Appl. No.: 08/914,883

[22] Filed: Aug. 19, 1997

Related U.S. Application Data

[63] Continuation of application No. 08/516,185, Aug. 18, 1995, abandoned, which is a continuation-in-part of application No. 08/205,539, Mar. 4, 1994, Pat. No. 5,463,214.

[51] Int. Cl.⁶ .................................................. G06K 08/10
[52] U.S. Cl. .............................. 235/462.12; 235/462.15
[58] Field of Search .................. 235/462.01, 462.02, 235/462.07, 462.09, 462.1, 462.11, 462.15, 462.16, 462.12, 472.01, 472.02

[56] References Cited

U.S. PATENT DOCUMENTS

| | | | |
|---|---|---|---|
| 4,931,628 | 6/1990 | Wada | 235/456 |
| 4,964,066 | 10/1990 | Yamane et al. | 235/454 |
| 5,218,191 | 6/1993 | Chadima, Jr. et al. | |
| 5,241,164 | 8/1993 | Pavlidis et al. | 235/462 |
| 5,262,626 | 11/1993 | Goren et al. | 235/462.07 |
| 5,278,398 | 1/1994 | Pavlidis et al. | 235/462 |
| 5,404,004 | 4/1995 | Sato et al. | 235/472 |
| 5,466,921 | 11/1995 | Lapinski et al. | 235/462.12 |
| 5,481,103 | 1/1996 | Wang | 235/462.12 |
| 5,493,108 | 2/1996 | Cherry et al. | 235/462.12 |
| 5,495,097 | 2/1996 | Katz et al. | 235/462.12 |
| 5,510,604 | 4/1996 | England | 235/462 |
| 5,548,107 | 8/1996 | Lapinski et al. | 235/462 |
| 5,548,108 | 8/1996 | Moldsked et al. | 235/462 |
| 5,821,519 | 10/1998 | Lee et al. | 235/462 |
| 5,825,006 | 10/1998 | Longacre et al. | 235/462 |
| 5,868,715 | 11/1998 | Watanabe et al. | 235/436 |

FOREIGN PATENT DOCUMENTS 24543  7/1977  Japan.

OTHER PUBLICATIONS

Utility Model translation, Sakai et al, Feb. 1978.

Primary Examiner—Thien Minh Le
Attorney, Agent, or Firm—Wall Marjama Bilinski & Burr

[57] ABSTRACT

A method and apparatus for optimizing the data throughput of decoded-output scanners by maintaining a tracking relationship between the scanning and decoding operations thereof. Data is scanned from an indicia to be read on an uninterrupted cyclic basis and stored in memory. Also stored is continuously updated data that allows the most recently completed block of scan data to be identified. Data is decoded on an uninterrupted cyclic basis, at the same timet hat new data is being scanned. A loose, tracking relationship is maintained betwen the scanning and decoding operations so that decoding always begins with the then most currently available data.

31 Claims, 10 Drawing Sheets

| SCANNING | SCAN 1 | SCAN 2 | SCAN 3 | SCAN 4 | SCAN 5 | SCAN 6 | SCAN 7 | SCAN 8 |
|---|---|---|---|---|---|---|---|---|
| DECODING | | DECODE SCAN 1 | DECODE SCAN 2 | DECODE SCAN 3 | DECODE SCAN 4 | DECODE SCAN 5 | DECODE SCAN 6 | DECODE SCAN 7 |

FIG.4A

| SCANNING | SCAN 1 | SCAN 2 | | SCAN 3 | | SCAN 4 | | SCAN 5 |
|---|---|---|---|---|---|---|---|---|
| DECODING | | DECODE SCAN 1 | | DECODE SCAN 2 | | DECODE SCAN 3 | | DECODE SCAN 4 |

FIG.4B

| SCANNING | SCAN 1 | SCAN 2 | SCAN 3 | SCAN 4 | SCAN 5 | SCAN 6 | SCAN 7 | SCAN 8 |
|---|---|---|---|---|---|---|---|---|
| DECODING | | DECODE SCAN 1 | | DECODE SCAN 2 | | DECODE SCAN 5 | | DECODE SCAN 7 |

FIG.4C

| | SCAN 1 | SCAN 2 | SCAN 3 | SCAN 4 | SCAN 5 | SCAN 6 | SCAN 7 | SCAN 8 |
|---|---|---|---|---|---|---|---|---|
| SCANNING | (MEM A) | (MEM B) | (MEM A) | (MEM B) | (MEM A) | (MEM B) | (MEM A) | (MEM B) |
| DECODING | | DECODE SCAN 1 (MEMORY A) | | DECODE SCAN 3 (MEMORY B) | | DECODE SCAN 5 (MEMORY A) | | DECODE SCAN 7 (MEMORY B) |

| | SCAN 1 | SCAN 2 | SCAN 3 | SCAN 4 | SCAN 5 | SCAN 6 | SCAN 7 | SCAN 8 |
|---|---|---|---|---|---|---|---|---|
| SCANNING | (MEM A) | (MEM B) | (MEM C) | (MEM A) | (MEM C) | (MEM B) | (MEM C) | (MEM A) |
| DECODING | | DECODE SCAN 1 (MEMORY A) | | DECODE SCAN 2 (MEMORY B) | | DECODE SCAN 4 (MEMORY A) | | DECODE SCAN 6 (MEMORY B) |

APPARATUS FOR OPTIMIZING THROUGHPUT IN DECODED-OUTPUT SCANNERS AND METHOD OF USING SAME

This is a continuation of prior application Ser. No. 08/516,185, filed Aug. 18, 1995, now abandoned which is a continuation-in-part of application Ser. No. 08/205,539, filed Mar. 4, 1994, now issued as U.S. Pat. No. 5,463,214.

BACKGROUND OF THE INVENTION

1. Field of the Invention

This invention relates to decoded-output scanners and, more particularly, to a method and apparatus for optimizing the data throughput of decoded-output scanners by maintaining a tracking relationship between the scanning and decoding operations thereof.

2. Description of the Prior Art

Optical scanners, such as bar code readers, perform the function of converting optically readable patterns into electrical signals. Such patterns may be presented linearly, as in one dimensional (1D) bar code symbols, or two dimensionally as in two dimensional (2D) bar code or other symbols. Decoded-output scanners perform the additional function of interpreting or decoding these signals and obtaining meaningful information therefrom. This is performed by associated decoding circuitry which may or may not be integral to the scanning circuitry. The output of the system, then, is the result of both scanning and decoding.

Optical scanners whether of the stationary or movable type, usually operate at a fixed scanning rate. That is to say the scanners are set so as to perform some fixed number of scans during a given amount of time. This generally ranges between 30 and 200 scans/sec. Prior to the present invention the decoding function of decoded-output readers was synchronized with the scanning function thereof. That is to say that the scanning operation proceeds at a predetermined fixed rate and the information collected by the scanner is decoded by the decoder in a parallel operation.

Prior art optical scanners operate relatively satisfactorily under conditions in which the data throughput rate, or rate at which data is scanned and decoded, is relatively low. If, for example, the scanning rate is relatively low and/or the data content of the bar code or other symbol is relatively small, i.e., the scanner is operating under a relatively light decoding load, the decoding phase of the reading process can be completed between successive scans. Under these conditions scan data can be accurately decoded without difficulty. Operation under these conditions is inefficient, however, since the decoding circuitry is idle much of the time and since operation under such conditions has a low data throughput rate.

Scanners of the above-described type also have the disadvantage that, if they are operated under relatively heavy decoding loads, i.e., are required to scan, at high scanning rates, symbols that have a relatively high data content, the synchronism between the scanning and decoding phases of the reading process will break down. This is because under heavy decoding loads the decoding phase of a read operation takes longer than the scanning phase thereof, causing the decoding operation to lag behind the scanning operation. While this time lag can be dealt with for brief periods of time by storing scan data in a scan memory and decoding that data in the order received when the decoder becomes available, it cannot be dealt with in this way for long. This is because, however large the scan memory, it will eventually overflow and result in a loss of scan data.

Thus, a need has existed for a scanning-decoding method and apparatus that is able to scan and decode optically encoded patterns, such as bar code symbols, quickly and efficiently, even under heavy decoding loads, to ensure that the operator of the scanner obtains the necessary data from the optically encoded patterns.

SUMMARY OF THE INVENTION

In accordance with the invention, there is provided an improved method and apparatus for scanning and decoding optical patterns at high data throughput rates without a corresponding reduction in read accuracy.

In prior U.S. Pat. No. 5,463,214, which is hereby expressly incorporated herein by reference, there is disclosed an embodiment of the invention in which high data throughput rates are achieved by operating the decoding circuitry of the scanner on a substantially continuous basis, i.e., at a 100% utilization rate, and by utilizing scanning circuitry that can be stopped and started substantially instantaneously as necessary to coordinate the scanning and decoding phases of the reading process. Because this embodiment of the invention is described and claimed in said prior U.S. patent, it will not be discussed in detail herein.

In accordance with the present invention, there are disclosed embodiments of the invention in which high data throughput rates are achieved by operating the scanning circuitry of the reader on a substantially continuous basis, i.e., at an approximately 100% utilization rate, and by utilizing decoding circuitry which operates so as to maintain a "tracking" relationship between the scanning and decoding phases of the reading process. This tracking relationship is characterized not by an inflexibly maintained lockstep synchronism between the scanning and decoding operations, but rather by a loosely maintained linkage between the decoding operation and the most recent scan data produced by the scanning operation.

Significantly, this tracking relationship between the scanning and decoding operations has been found to be compatible with the complete and accurate decoding of optically encoded patterns. This result is possible because patterns, such as 2D bar code symbols, which have a relatively high data content which often include both vertical redundancy and error checking bits which make it possible for the symbol to be fully decoded even if part of that symbol is skipped or unreadable. In accordance with the present invention, this property is utilized by skipping over those blocks or units of scan data which, though complete, have been superseded by a more recent block of scan data. Stated differently, although the loose tracking used by the present invention may result in some loss of scan data, that loss takes place in favor of more current scan data which, even if incomplete, permits a symbol to be fully decoded.

In a first embodiment of the invention, both the scanning and decoding phases of the reading process proceed without interruption. In embodiments of this type a relatively large number of blocks of scan data are stored in and/or shifted through a relatively large memory space. As this occurs, address information (e.g. address pointers) which is indicative of the beginnings and endings of the scan blocks are updated, substantially in real time, so that the reader can at all times keep "track" of which block of scan data is the most recently completed block. Then, as each decoding cycle is completed, it is immediately followed by another decoding cycle which begins at the beginning of the most recently completed block of scan data, skipping over any then older blocks of scan data. In this way, both the scanning and decoding operations take place at a substantially 100% utilization rate, thereby assuring a high data throughput rate.

In a second embodiment of the invention, the scanning and decoding phases of the reading process preferably (but not necessarily) proceed without interruption. In embodiments of this type blocks of scan data are stored in two or more sequentially selected memory spaces, having a predetermined size, scan data for each newly begun scan being written over the scan data in the memory space with the then oldest complete block of scan data. As this occurs, the memory space with the then most current block of scan data may be identified using an address pointer which directs the reader to one of the known scan data starting addresses.

Either of the two above-described embodiments of the invention may be practiced using either a 1D image sensor or a 2D image sensor, such as an image sensor of the charge coupled or CCD type. In the case of bar code symbols, this is true whether the bar code symbols are 1D symbols or 2D symbols. This does not, however, mean that embodiments which use 1D image sensors have the same memory requirements as those which use 2D image sensors.

In the case of embodiments of the invention which use a 2D image sensor, both 1D and 2D bar code symbols may be captured and stored in a single step, full frame imaging operation while the sensor is held stationary with respect to the symbol. A method and apparatus for capturing and storing 1D and 2D bar code symbols in this manner is shown and described in commonly assigned copending U.S. patent application entitled "Optical Reader Having Improved Interactive Image Sensing and Control Circuitry", Ser. No. 08/441,447, filed May 15, 1995. With embodiments of this type, the memory requirements of the invention are relatively large.

In the preferred embodiments of the invention, the beginnings and endings of each block of scan data are fixed with a high degree of precision by using interrupt signals such as start and/or end of scan signals which are derived directly or indirectly from the timing signals that control the imaging activity of the image sensors. Because these timing signals are ultimately derived from a highly stable source, such as a crystal oscillator, and are synchronized with the imaging activity of the image sensor, they allow blocks of scan data to be easily and accurately located. In addition, since scanning takes place without interruption (except when the scanning function is not called for), a single interrupt signal may be used to locate both the end of one block of scan data and the beginning of the next. As a result, the invention not only accurately locates each individual block of scan data, it also accurately locates the boundaries between adjacent blocks of scan data.

BRIEF DESCRIPTION OF THE DRAWINGS

For a better understanding of these and other objects of the present invention, reference is made to the detailed description of the invention which is to be read in conjunction with the following drawings, wherein.

DETAILED DESCRIPTION OF THE INVENTION

Figure 1:
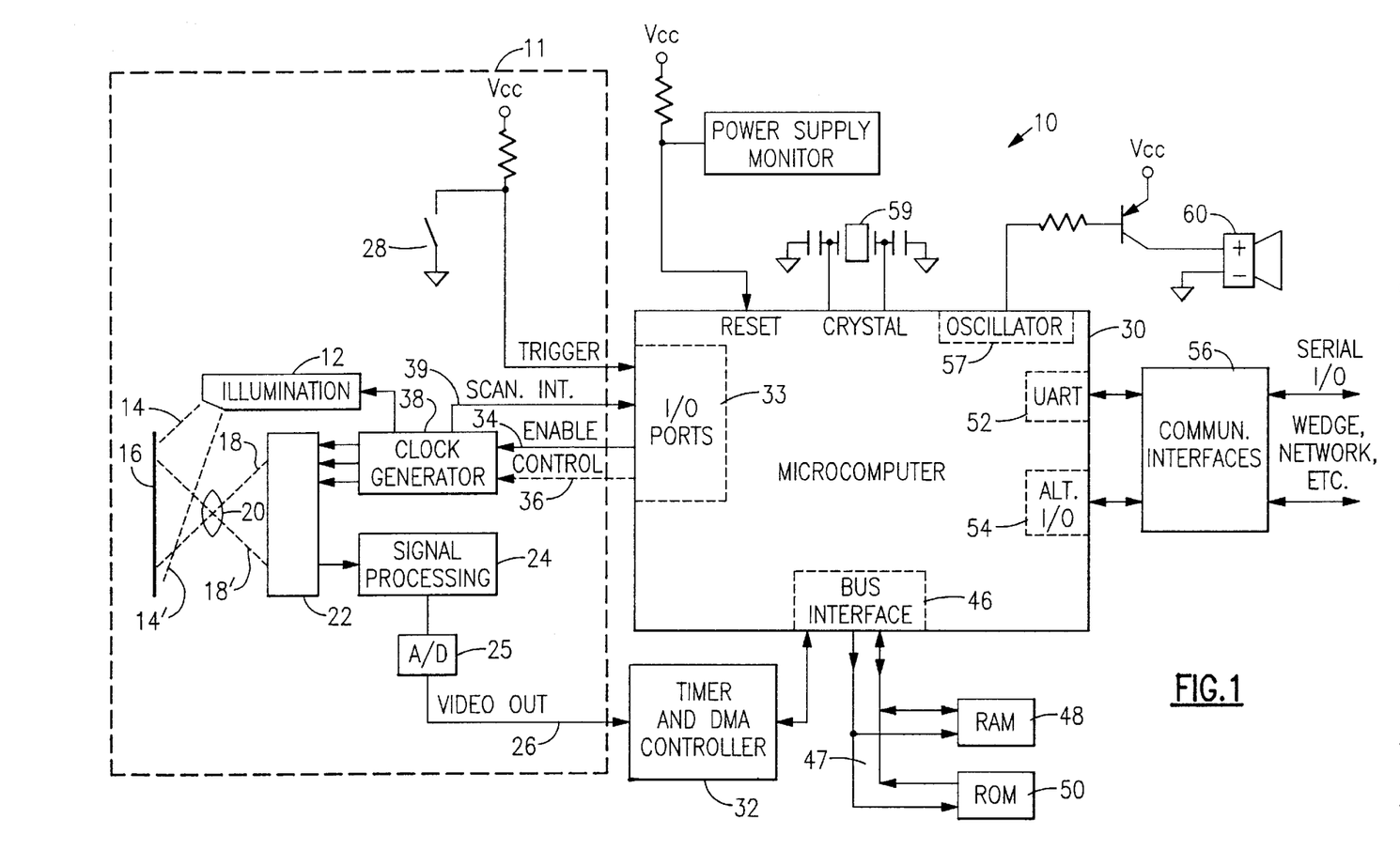
FIG. 1 is a schematic-block diagram of a first embodiment of a reader constructed in accordance with the present invention.

Referring to FIG. 1, there is shown a block diagram of one embodiment of an optical reader 10 suitable for use in practicing the present invention. Reader 10 includes a scanning section 11, which is enclosed by dotted lines at the left side of FIG. 1. Scanning section 11 includes an illuminator 12, such as an LED array, a laser, or the like, which produces a light beam represented by outer defining rays 14, 14'. The beam strikes a target 16 on which are found visible indicia, such as 1D or 2D bar code symbols or OCR characters. This light beam is reflected through optics 20, the reflected beam being shown representatively as rays 18, 18'. Optics 20 projects an image of the indicia onto an image sensor 22 which, in the embodiment of FIG. 1, preferably comprises a 1D CCD type image sensor. Analog signals developed by image sensor 22 in response to light incident thereon are received and processed by a signal processing circuit 24 and an analog to digital converter 25 to produce a digitized video output signal on an output conductor 26.

Reader 10 also includes scanning control and decoding circuitry which preferably comprises a programmed microcomputer 30 together with a DMA controller 32. In operation, microcomputer 30 controls the operation of scanning section 11 and decodes the data produced thereby in accordance with a program stored in a ROM 50. DMA controller 32 assists microcomputer 30 by taking over therefrom the task of receiving digitized video data produced by scanning section 11 and directing this data through a bus interface 46 and a bus 47 to a RAM 48. DMA controller 32 may also include circuitry which performs a variety of other support and housekeeping functions for microcomputer 30 and in this way allows the latter to devote more time to decoding activities and thereby increase the data throughput rate for the reader as a whole. If desired, these functions may be integrated into a single application specific integrated circuit (ASIC). One example of an ASIC of this type is commercially available from Welch Allyn, Inc., Skaneateles Falls, N.Y. under the part number designation 21203276-01.

Operation of scanning section 11 is controlled by a trigger 28, which can be a manual trigger, or an automatic trigger that responds to the presence of indicia. Trigger 28 is coupled to microcomputer 30 via an I/O port section 33. Microcomputer 30 outputs a scan enable signal on a line 34 responsive to the trigger 28 to turn on scanning section 11 and begin scanning target symbol 16. Control signals are output on a line 36 to control clock generator 38 which in turn provide suitable enabling signals for illuminator 12 and clock signals 42 for image sensor 22 as required for the proper operation thereof. Clock generator 38, is also arranged to generate a scan interrupt (or end of scan) signal which is applied as an input to I/O port 33 via conductor 39 to provide microcomputer 30 with information that indicates the times at which each block of scan data ends.

Microcomputer 30 may also be provided with a UART 52 and an auxiliary I/O port section 54 for connecting communications devices (not shown) to the reader. Representative of such devices are a keyboard when the scanner is employed in a wedge configuration, a telecommunications network, and other devices as may be required for a given application of the system.

Figure 2:
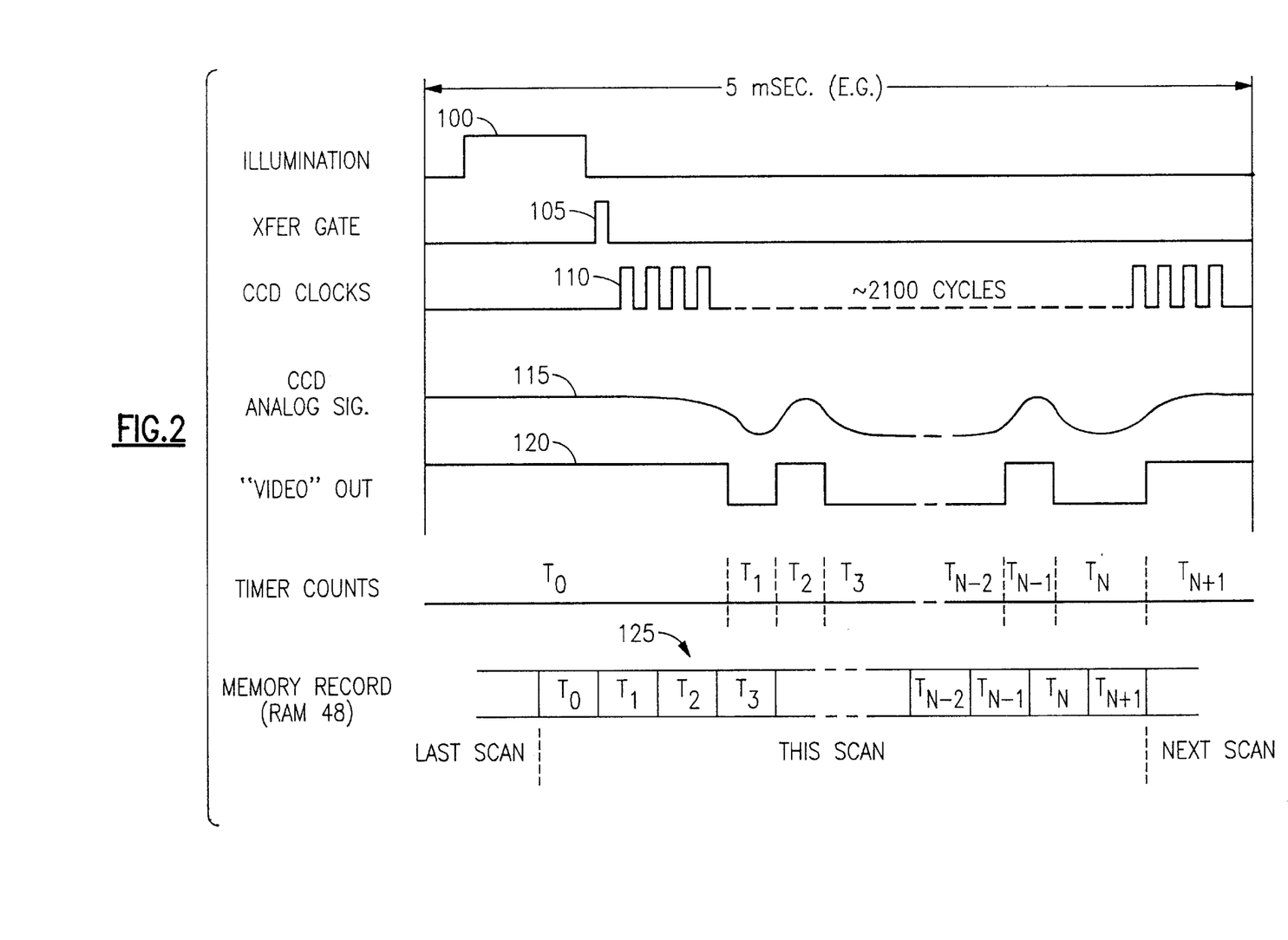
FIG. 2 shows a representative CCD scan cycle.

A typical scan cycle for the reader of FIG. 1 (a linear scanning device) is shown in FIG. 2. During the time period of the scan (5 msec is used in the figure, although this can vary) the cycle begins with illumination pulse 100 during which the target is illuminated. The target may contain bar code or any other indicia which is amenable to scanning and decoding. During the illumination pulse 100, photosensors in image sensor 22 receive a linear image of the target and convert that image to an electrical representation thereof. This electrical representation is then transferred via a transfer gate 105 to an analog shift register and clocked with pulses 110 to shift the image out as an analog signal 115. Analog signal 115 is then transformed into a digitized video output signal 120 by an A/D converter 25 and output over a line 26. Video signal 120 is a digitized representation of whatever high contrast elements were observed during illumination pulse 100. The time between successive leading and trailing edges of the video out signal 120 is then timed using the microprocessor clock counts as a time reference, to produce a timercount representation 125 of the result of the scan. This timercount representation is preferably produced by timer circuitry, included with DMA controller 32, which then controls the storage of the resulting timercount representation in RAM 48, while concurrently the microprocessor may be undertaking other operations including the decoding of prior scan data.

Figure 1A:
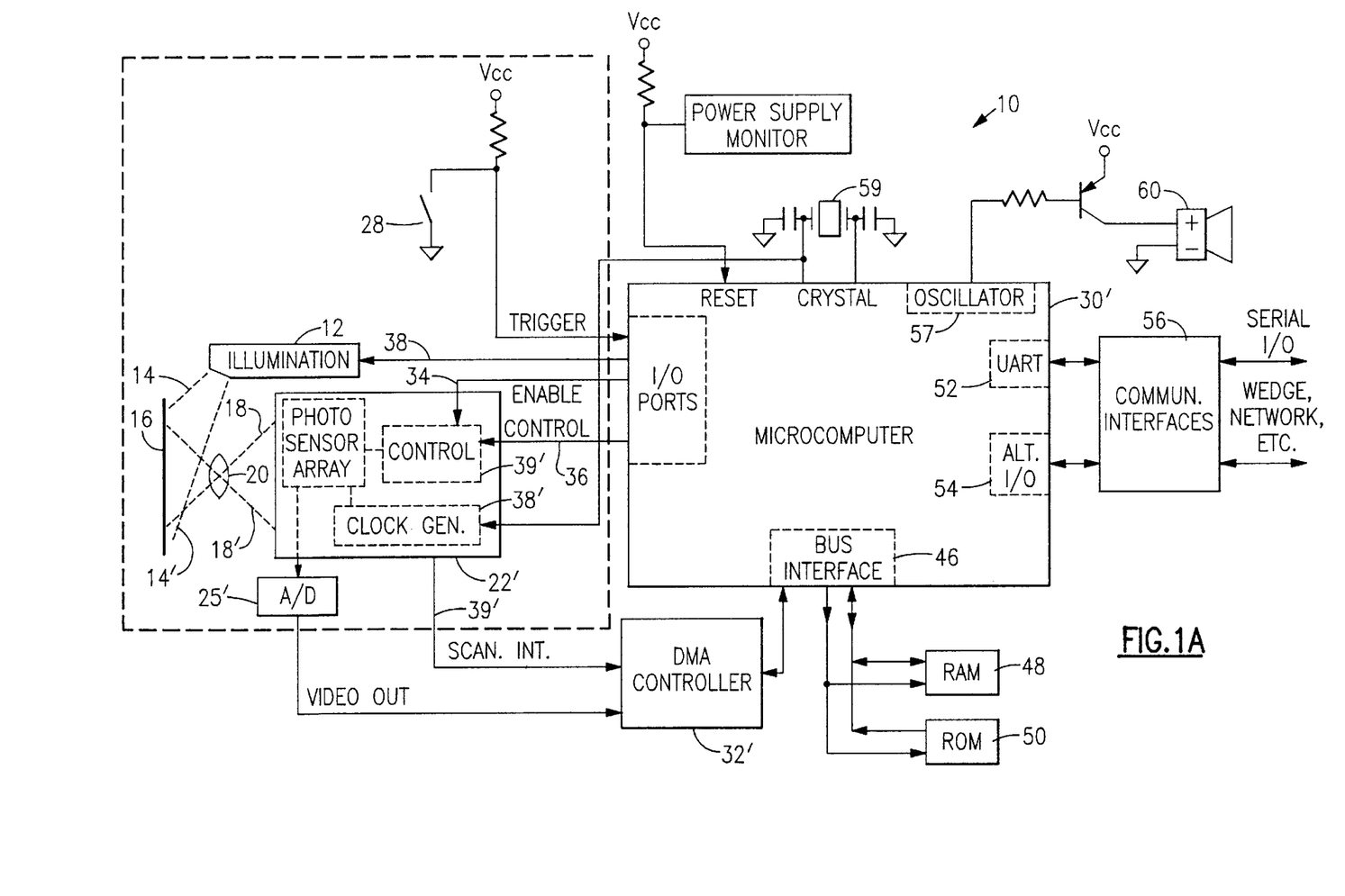
FIG. 1A is a schematic-block diagram of a second embodiment of a reader constructed in accordance with the present invention.

Referring to FIG. 1A there is shown a second embodiment 10' of a reader suitable for use in practicing the present invention. Reader 10' of FIG. 1A is generally similar to reader 10 of FIG. 1, except that it has a scanning section 11' which includes a 2D image sensor 22' that processes indicia, such as 2D bar codes symbols, on a full frame rather than line-by-line basis, and a microcomputer 30' that is programmed to control sensor 22' and decode output signals produced thereby. Because 2D image sensors have many more pixels than a 1D image sensor, the reader of FIG. 1A will be understood to operate with higher clock rates and to use microcomputers and memory structures that are somewhat different from their counterparts in the reader of FIG. 1. These differences are differences of degree rather than of kind, however, and do not involve the broader aspects of the present invention, as will be made clear later in connection with FIGS. 4A–4D.

Unlike currently available 1D image sensors, some 2D image sensors include much of the control and clock generating circuitry necessary to control their operation. In the reader of FIG. 1A this fact is reflected by the showing of clock generator circuitry 38' within the outlines of image sensor 22'. Similarly, image sensor 22' of FIG. 1A is shown as including on-chip control circuitry 39' for generating control signals which in the case of the embodiment of FIG. 1 are supplied by microcomputer 30. These differences between the readers of FIGS. 1 and 1A will be understood to reflect different manufacturer selected groupings of known imaging control circuitry and not to be material to the practice of the present invention.

Because 2D image sensors produce video output signals that include data for a number of different horizontal rows of the symbols imaged thereby, and are designed to be used without regard to the orientation of the symbol with respect thereto, their outputs are more usefully processed and stored as bit mapped or bit image representations of symbols than as timercount representations thereof. As a result, DMA controller 32' of the embodiment of FIG. 1A need not include timer circuitry of the type included in DMA controller 32 of the embodiment of FIG. 1. On the other hand, DMA controller 32' of the embodiment of FIG. 1A preferably does include circuitry for receiving the "end of frame" signal produced by 2D image sensor 22' and using it as a scan interrupt signal without involving microcomputer 30'. As in the case of DMA controller 32, DMA controller 32' and the associated scanning control circuitry may be integrated into a single ASIC. In both embodiments, however, the DMA controller is designed to receive and process image data of the type produced by the image sensor with which it is used and to control the storage of that image data in the form and in the quantity best suited to the decoding activity of the microcomputer with which it is used. Thus, while DMA controllers 32 and 32' differ in the specifics of their design, they operate in generally the same way to receive and store image data for decoding by the associated microcomputer with minimal involvement by that microcomputer.

With the embodiment of FIG. 1 the stored scan data is a timercount representation of a 1D image of the indicia of interest, as shown in FIG. 2. Because the number of memory locations necessary to store this scan data is dependent upon the number of data transitions in the scan, the length of a complete block of scan data will vary from scan to scan. With the embodiment of FIG. 1A, however, stored scan data is the bit mapped or bit representation of the indicia of interest. Because the number of memory locations necessary to store this scan data depends only on the number of pixels in the 2D image sensor, the length of a complete block of scan data will be the same for each scan.

Figure 3A:
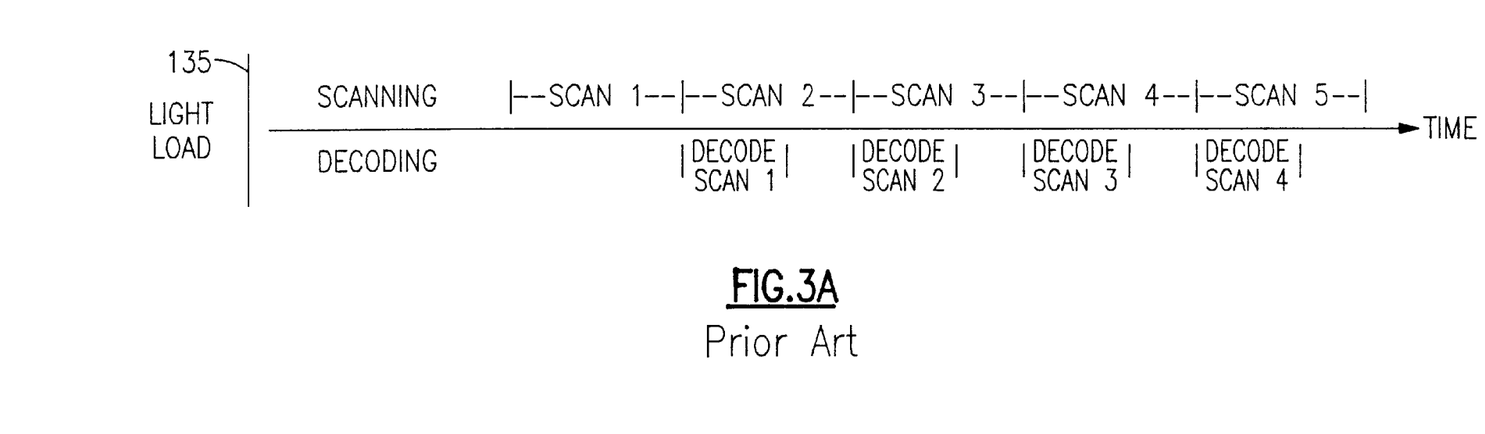
FIGS. 3A and 3B show timing diagrams illustrating the scanning and decoding operations of a typical prior art optical reader under light and heavy decoding loads, respectively.

In order to avoid unnecessary repetition, the terms "scan" and "block of scan data" as used herein will be understood to refer to both of the above-described types of scans generically where the context permits, or non-generically to one or the other of these types of scans where the context indicates that only one or the other is being referred to. For example, the descriptions of FIGS. 3 and 4 which follow are framed in generic terms and will be understood to apply to embodiments of the invention which use either 1D or 2D image sensors. The descriptions of FIGS. 5–9, on the other hand, will be framed in embodiment-specific terms, except where otherwise indicated.

Scanning of indicia can take place under either of two generalized conditions, depending upon the decoding load presented by the indicia. Under light decoding loads, shown in FIG. 3A for a prior art reader, the amount of data to be decoded is relatively small, allowing scan data from a complete scan to be decoded in a time which is less than the duration of a scan. Under this condition, the result of each scan is decoded before the completion of the following scan, and no problems arise as a result of any mismatch between the scan time and the decode time of the reader. The prior art and the instant invention perform equally well under such light decoding loads as will be seen later from FIG. 4.

Figure 3B:
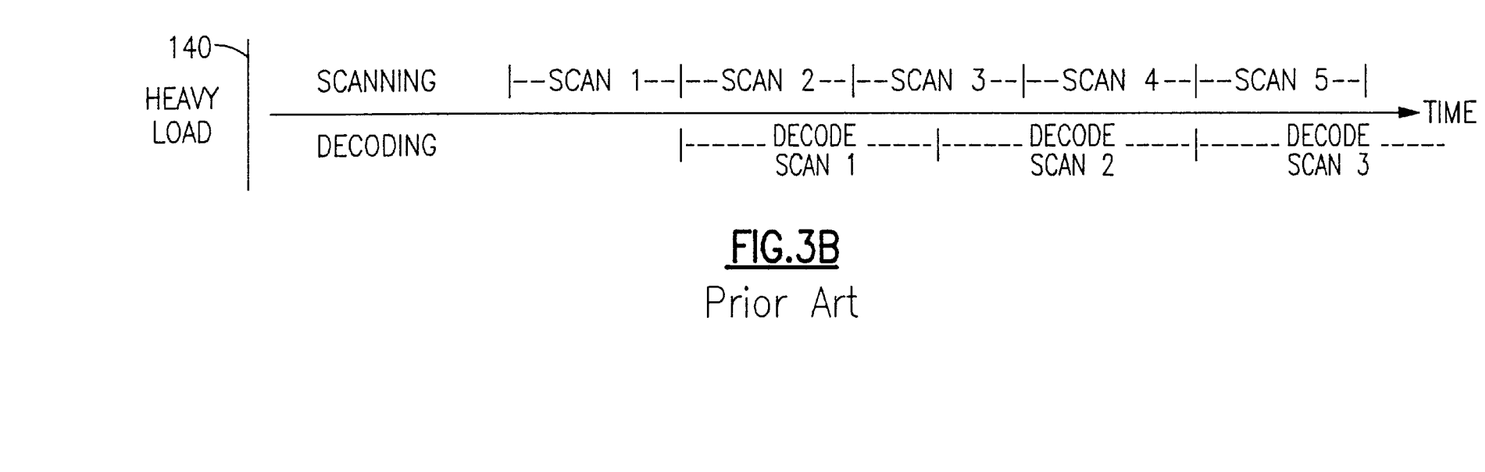

Under heavy decoding loads, however, prior art methods do not allow sufficient time for decoding. Thus, as shown in FIG. 3B, when a first scan Scan 1 is completed, a second scan Scan 2 is initiated immediately. Scan 2 is then followed by Scan 3 while the decoding of Scan 1 is still in progress. As this situation continues, the decoding process will be seen to fall further and further behind the scanning process until, at some point, the data memory becomes filled. When this occurs new scan data will overwrite old scan data which was not processed, thereby causing a loss of large blocks of scan data.

Figure 4A:
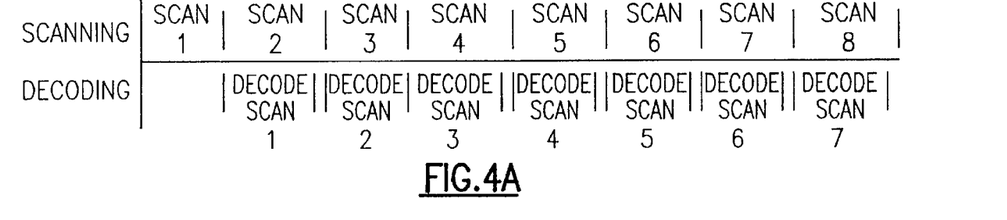
FIG. 4A shows timing diagrams illustrating the scanning and decoding operations of all embodiments of the present invention under light decoding loads.

In the embodiment of the invention disclosed in prior U.S. Pat. No. 5,463,214, this problem is solved by modifying the reader in a way that allows the scanning process to be suspended and restarted as required to prevent the decoding process from falling so far behind the scanning process that data overflows the memory and is lost. This solution to the problem may be understood with reference to FIGS. 4A and 4B. Referring to FIG. 4A, there is shown the operation of the subject embodiment of the invention under light decoding loads. It will be noted that, under this condition, the relationship between scanning and decoding is the same as that shown in FIG. 3A.

Figure 4B:
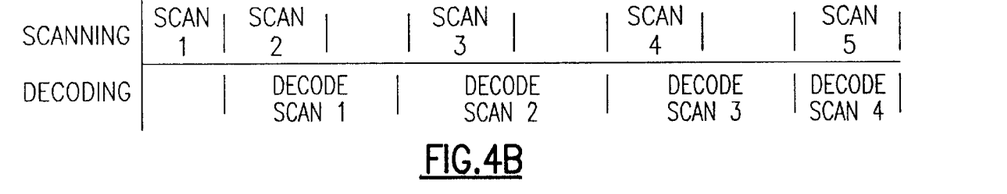
FIG. 4B illustrates the scanning and decoding operations of the embodiment of the invention described in prior U.S. Pat. No. 5,463,214 when operating under heavy decoding loads.

FIG. 4B shows the relationship which exists between the scanning and decoding processes when the subject embodiment of the invention is used under heavy decoding loads. As shown in FIG. 4B, the suspension of the scanning process continues until the results of the prior scan have been decoded. This prevents the decoding process from falling more than a small amount of time behind the scanning process. As a result, there cannot arise a situation, such as that which can arise with the prior art, in which there is a massive loss of scan data. Because this embodiment of the invention is described in detail in the last-mentioned copending application, it will not be described in detail herein.

Figure 4C:
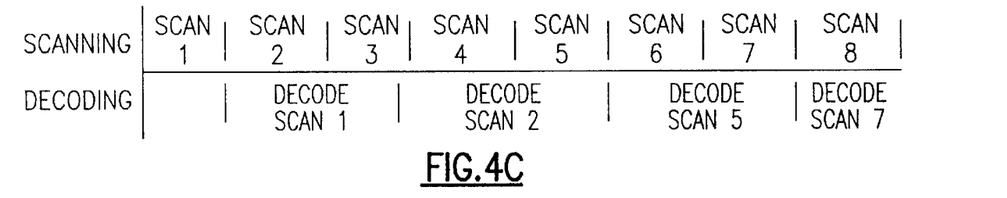
FIGS. 4C, 4D and 4E illustrate the scanning and decoding operations of various embodiments of the invention described herein when operating under heavy decoding loads.

Referring to FIG. 4C there is shown the tracking relationship which exists between the scanning and decoding operations when these operations are controlled in accordance with a first embodiment of the present invention. With this embodiment, under heavy decoding loads, decoding proceeds without interruption so long as the scanning function is called for. As shown in FIG. 4C, each decoding operation begins immediately after the preceding decoding operation ends, and proceeds on the basis of the scan data from the then most current complete block of scan data.

More particularly, FIG. 4C illustrates one possible scenario in which decoding of Scan 1 data is immediately followed by the decoding of Scan 2 data. This occurs because Scan 3 data is incomplete at the time that the second decoding operation begins. The decoding of Scan 2 data, however, is immediately followed by the decoding of Scan 5 data. This occurs because Scan 5 data represents the then most current complete block of scan data. While the results of scans 3 and 4 are therefore unused and skipped over, the data lost by their non-use is provided by more current scan data or, if decoding is unsuccessful, by the results of a later scan. Any occasional decoding failure that results from the skipping of relatively old blocks of scan data is in any case more than offset by the avoidance of the large scale data losses discussed in connection with FIG. 3B.

Figure 4D:
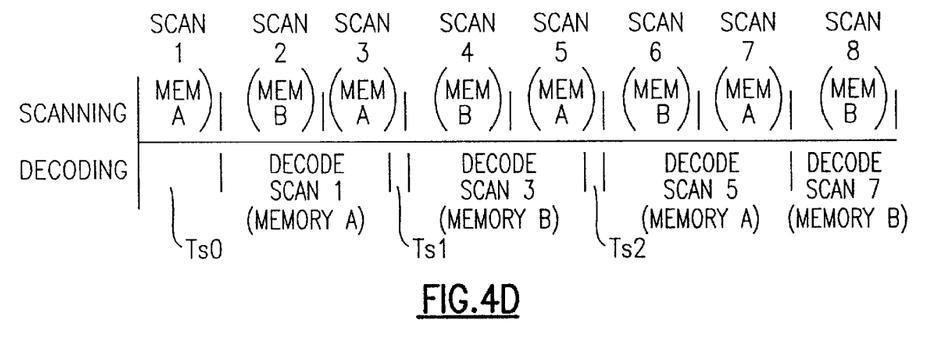

Referring to FIG. 4D there is shown the tracking relationship which exists between the scanning and decoding operations when these operations are controlled in accordance with an embodiment of the present invention which includes two and only two scan data memory spaces A and B. With this embodiment decoding does not proceed without interruption. As shown in FIG. 4D, each decoding operation begins at the beginning of a block of scan data. In the event that the end of a decoding operation does not coincide with the beginning of such a block, i.e., occurs while a scanning operation is still in progress, the beginning of the next decoding operation will be delayed until the scanning operation that is then in progress is completed, and then proceeds with reference to the block of scan data which is produced by that scanning operation.

More particularly, FIG. 4D shows that the decoding of Scan 1 data is completed while Scan 3 is still in progress, overwriting data for Scan 2. Under this condition, decoding is discontinued for a time period $T_{s1}$ that is equal to the time necessary for Scan 3 to be completed. At the end of time period $T_{S1}$, decoding resumes with the then most current block of scan data, namely: the scan data produced during Scan 3. Thus, like the embodiment whose operation is illustrated FIG. 4C, the embodiment whose operation is illustrated in FIG. 4D begins its decoding operation with the then most current complete block of scan data.

Figure 4E:
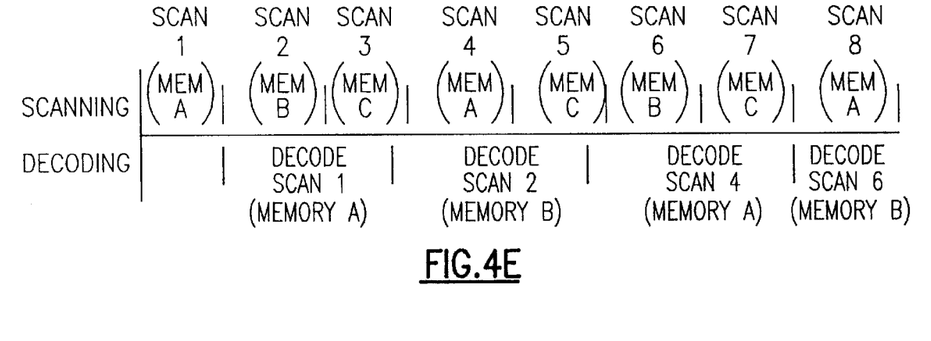
Figure 5:
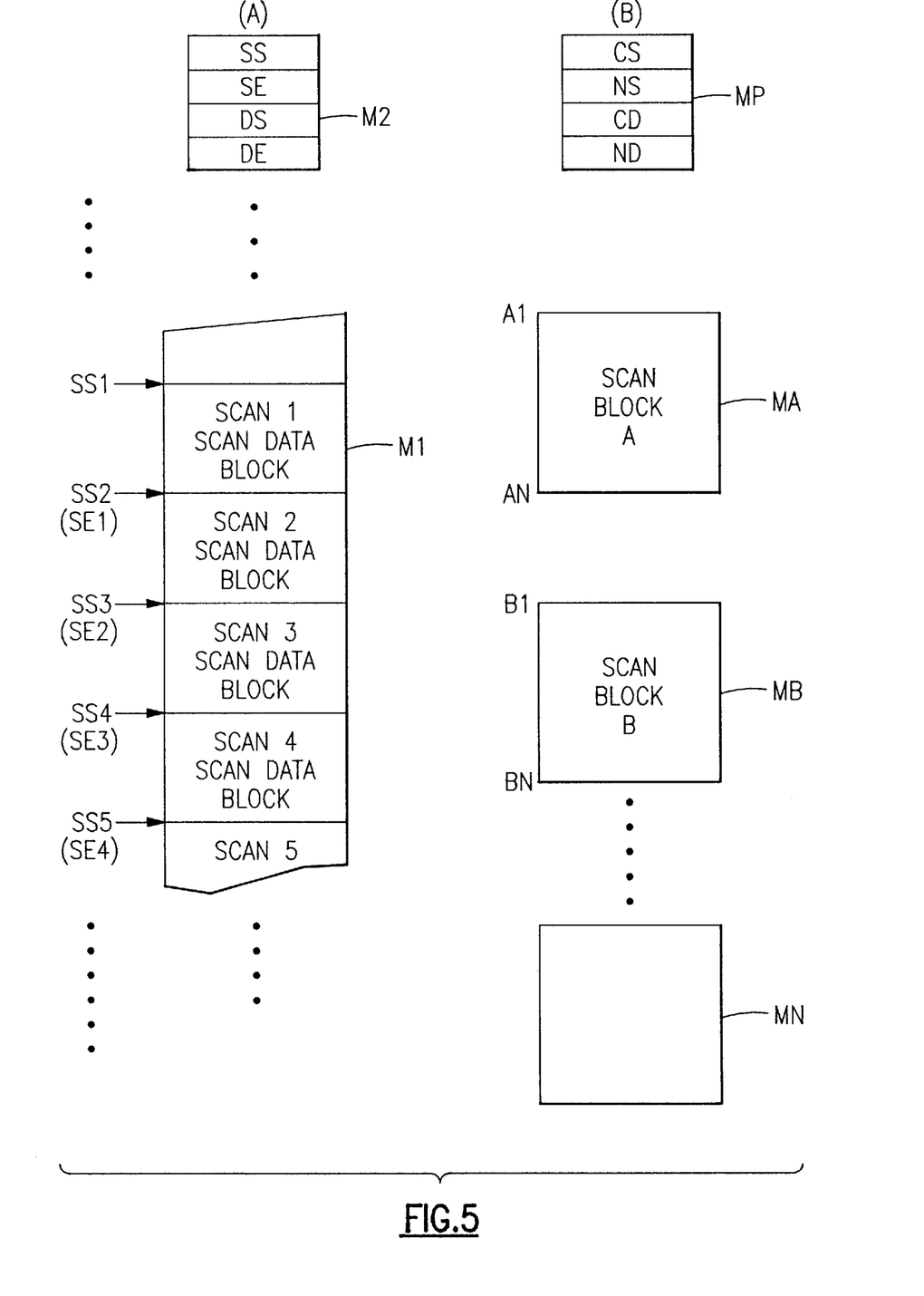
FIGS. 5A and 5B show memory and memory pointer structures which are suitable for use with the embodiments of FIGS. 1 and 1A, respectively.

Referring to FIG. 4E there is shown the tracking relationship which exists between the scanning and decoding operations when these operations are controlled in accordance with an embodiment of the invention which includes three scan data memory spaces A, B and C. With this embodiment decoding proceeds without interruption so long as the scanning function is called for. As shown in FIG. 4E, each decoding operation begins immediately after the preceding decoding operation ends, and proceeds on the basis of scan data from the memory which contains the then most current complete block of scan data.

More particularly, FIG. 4E shows that the decoding of Scan 1 is completed while Scan 3 is still being acquired. Under this condition, with three memory spaces available, decoding is immediately undertaken on the most recent complete Scan (Scan 2) which is contained in memory space B. Upon the completion of the decoding of Scan 2, decoding is commenced on Scan 4 which is contained in memory space A. Thus, the utilization of three memory spaces allows the decoding portion of the invention to be occupied one hundred percent of the time.

The embodiment illustrated in FIG. 4C is best suited for use with readers having memories and addressing procedures which can accommodate large numbers of relatively short blocks of scan data having sizes that are not known in advance. Applications of this type typically include readers, such as that shown in FIG. 1, which use 1D image sensors.

The embodiments illustrated in FIGS. 4D and 4E, on the other hand, are best suited for use with readers having memories and addressing procedures which can accommodate small numbers of relatively long blocks of scan data of fixed length. Applications of these types typically include readers, such as that shown in FIG. 1A, which use 2D image sensors. With the embodiment illustrated in FIG. 4D, only two scan data memory spaces are used and decoding is discontinuous. With the embodiment illustrated in FIG. 4E three scan data memory spaces are used and decoding is continuous. As will be explained more fully later, more than three scan data memory spaces can be used if additional decoding resources are made available. Each one of these different embodiments which is used in a particular application is a design choice which is based on economic considerations.

The fact that some embodiments of the invention use 1D image sensors while others use 2D image sensors should not be taken to mean that embodiments which use 1D image sensors can only read 1D symbols or that embodiments which use 2D image sensors can only read 2D symbols. This is because techniques exist for using either type of image sensor to read both 1D and 2D symbols. It will therefore be understood that the present invention is not restricted to use with any one type of image sensor or to any one type of bar code or other optically encoded symbol.

Referring to FIG. 5A, there is shown a memory space M1 suitable for use in storing blocks of scan data of the type produced by the reader of FIG. 1, together with a pointer or tracking memory M2 suitable for use in storing address or pointer information that makes it possible for the reader to identify the beginning and end point of a block of interest. As shown in FIG. 5A, the block of scan data produced during a first scan of the target is stored in memory M1 beginning at address SS1 (Scan Start for Scan 1) and ending at address SE1 (Scan End for Scan 1). Similarly, the block of scan data resulting from a second scan of the target is stored between addresses SS2 and SE2, and so on. Because scanning takes place continuously, the end of one scan block (e.g. SE1) coincides with the beginning of the next scan block (e.g., SS2). The sizes (in memory space) of these blocks will ordinarily vary from block to block, depending on the number of data transitions in each 1D scan of the target. The boundaries between blocks will, however, be fixed by the occurrence times of the Scan Interrupt signals which are generated by the image sensor or its clock generating circuitry.

As will be explained more fully in connection with the flow charts of FIGS. 6 and 7, locations SS and SE of memory M2 are updated in the course of a series of scans so that they always identify or otherwise point to the address of the beginning and ending of the most recently produced complete block of scan data. As a result, when the decoding circuitry is ready to decode the most recently produced complete block of scan data, it need only refer to locations SS and SE to obtain information as to where to begin and end decoding. Before decoding begins, the contents of locations SS and SE are written into locations DS (Decode Start) and DE (Decode End) so that locations SS and SE can continue to be updated while decoding proceeds on the basis of the contents of locations DS and DE. In the preferred embodiment, the decoding circuitry is programmed to mark these beginning addresses as "invalid" (for example, by changing its sign) after it is acquired. Since the decoding processor is programmed to decode only "valid" data, this assures that it can decode a single block of scan data only once.

Referring to FIG. 5B there are shown a plurality of memory spaces MA, MB . . . MN suitable for use in storing blocks of scan data of the type produced by the reader of FIG. 1A, together with a pointer or tracking memory MP suitable for use in storing address or pointer information for identifying the memory spaces to be used for entering new scan data, decoding, etc. Since the amount of scan data in each block of scan data is known in advance, being the same for each scan, the starting and ending addresses for each memory space (e.g., $A_1$ and $B_1$ and $A_N$ and $B_N$; etc.) will also be the same for each scan. As a result, the memory to be used for storing new scan data, decoding etc. may be specified by specifying just a few bits stored in memory MP. Location CS, for example, may be used as a pointer which identifies the memory where the current scan is being stored, and location NS may be used as a pointer which identifies where the next scanned image is to be stored.

Similarly, location CD may be used as a pointer which identifies the memory space where the current decode is being undertaken. Finally, location ND may be used as a pointer which identifies where the next available image is for decoding purposes.

Under ordinary circumstances, three scan data memory spaces will be sufficient to keep the decoding activity of the reader fully occupied and current. This is because the tracking method of the invention allows the skipping over of old blocks of scan data as necessary for the decoder to remain occupied and current. If the decoding load becomes extremely heavy, however, it is possible that more old blocks of scan data are skipped over than is advisable. In such instances, it may be desirable to increase the number of memory spaces from 3 to N, where N may be 4 or even more, and to use more than one decoding circuit. If such an increased number of memories and decoders is used, blocks of scan data may be distributed among the memories according to a simple sequential rule and kept track of by increasing the number of bits in the pointers of memory space MP. In addition, the decoding circuits may be assigned to the then most current complete block of scan data as they become free. It will be understood that all such numbers of memory spaces and decoding circuits and the associated tracking procedure are within the contemplation of the present invention.

The manner in which the circuits of FIGS. 1 and 1A are used with the memory structures of FIGS. 5A and 5B, respectively, to produce the tracking relationships shown in FIGS. 4C, 4D and 4E, respectively, will now be described with reference to the flow charts of FIGS. 6, 7, 8 and 9, respectively.

Figure 6:
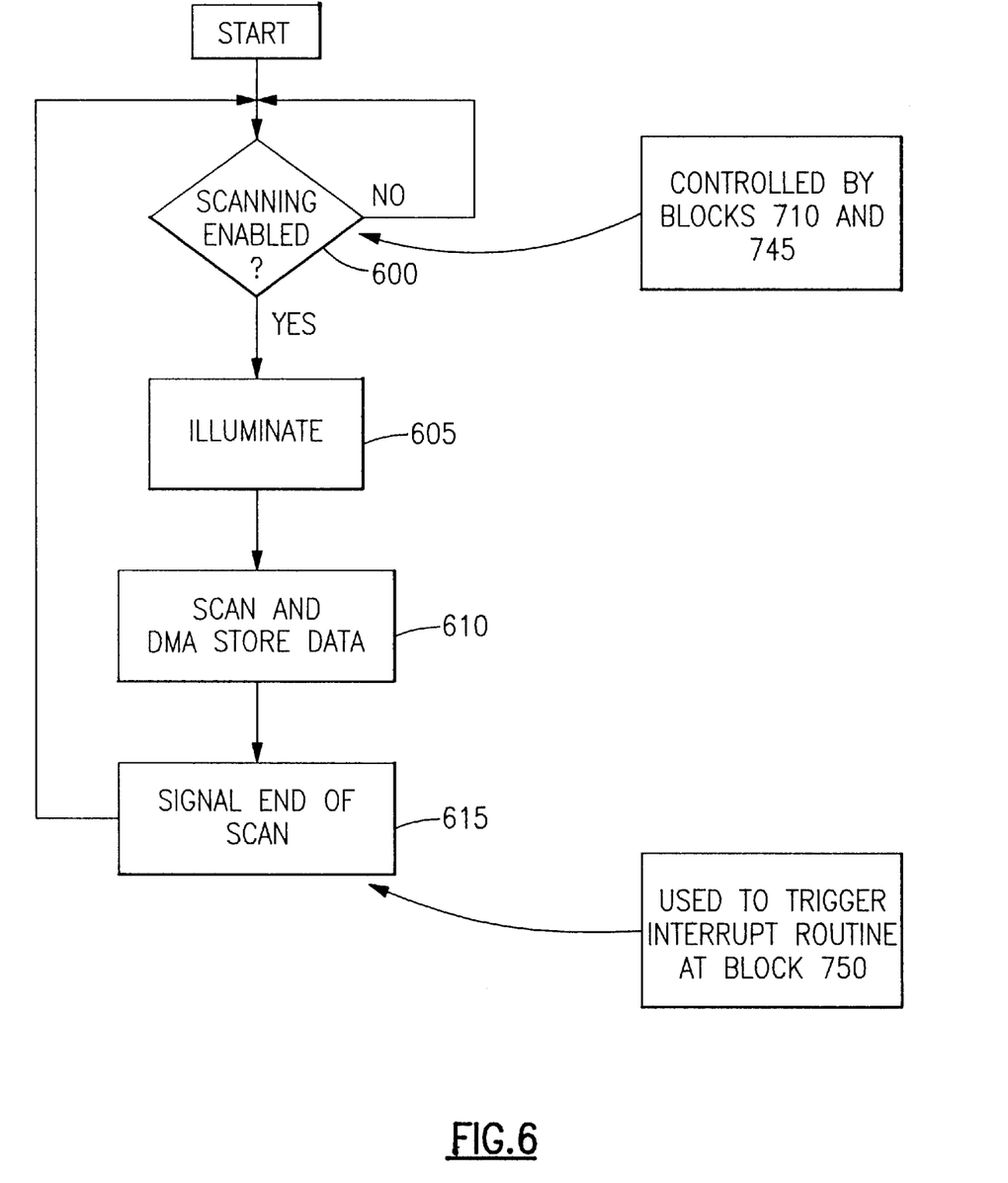
FIGS. 6 and 7 are flow charts illustrating the scanning and decoding phases, respectively, of a first embodiment of the present invention.
Figure 7:
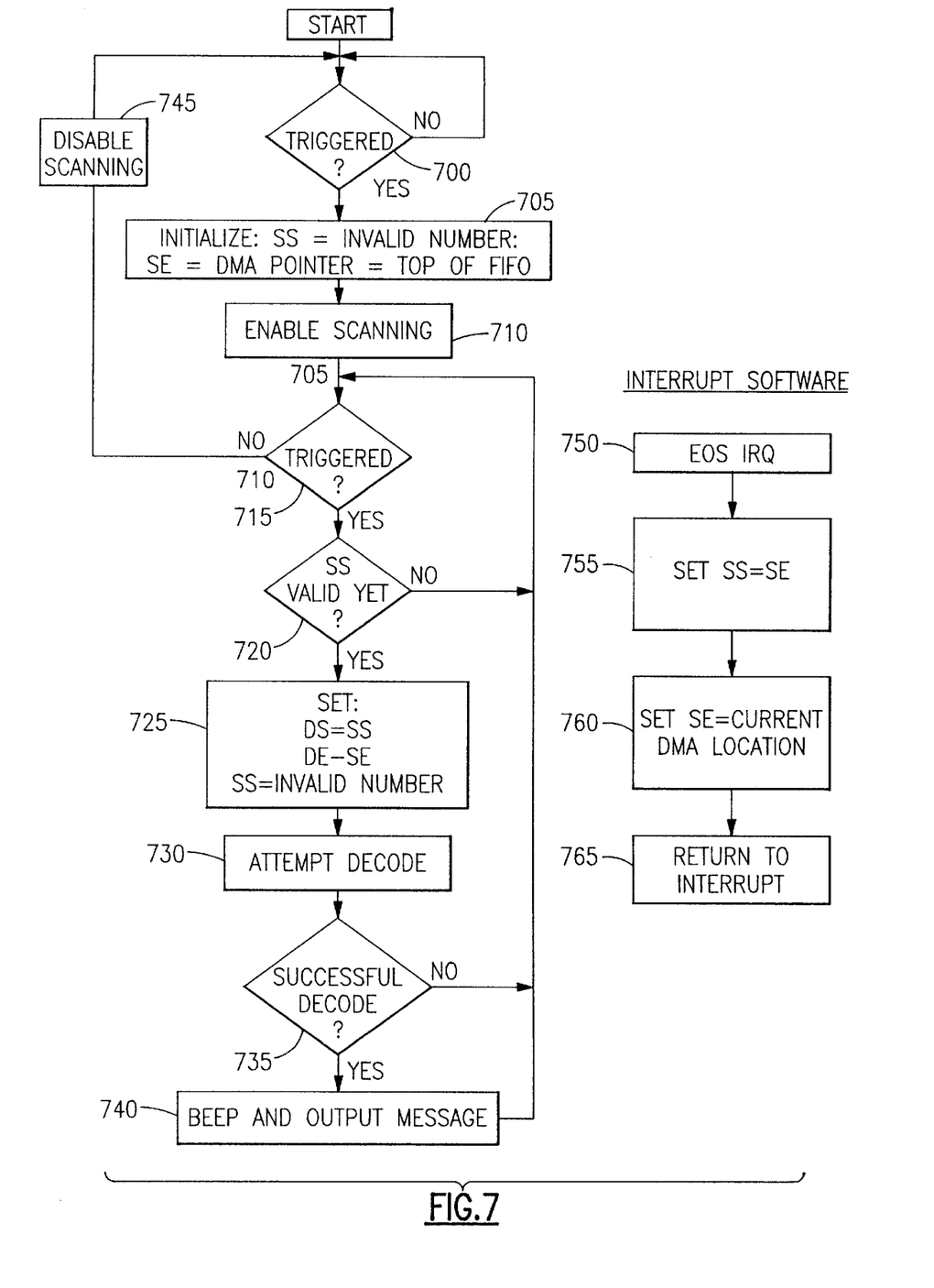

Referring to FIGS. 6 and 7, there are shown flow charts which illustrate the scanning and decoding operations used by the embodiment of FIG. 1. These processes are made up of a hardware component which operates independently and simultaneously with the Microprocessor to acquire images while the Microprocessor is decoding prior images. Secondly, a software interrupt routine is triggered by the scanning hardware which maintains the loose linkage between the hardware and the software of the present embodiment. Turning first to the scanning process shown in FIG. 6, this process begins with block 600, which causes the scanning hardware to test for whether scanning is enabled by the Microprocessor at Blocks 710 and 745. If not, the reader cycles through block 600 and waits. When scanning is enabled, the hardware operation proceeds to block 605 which illuminates the bar code symbol. After exiting block 605, the operation is directed to block 610 where the operation scans the 1D CCD who's output is stored by the DMA into a memory space. After exiting block 610, the operation at block 615 causes a signal which indicates that a scan has been completed. Upon completion, the scanning operation loops back to the beginning of the scanning operation at block 600 to acquire more scans unless disabled by the Microprocessor.

Referring to FIG. 7 when the End of Scan Interrupt signal is captured in the Microprocessor at block 750, the Microprocessor halts whatever it was doing. At block 755, the address associated with the end of the previously completed block of scan data is set into scan start pointer SS; this address is the memory address corresponding to the occurrence of the scan interrupt signal at the start of the most recent scan. It also causes the current address contained in the DMA pointer to be set into scan end pointer SE at block 760; this address is the memory address corresponding to the occurrence of the scan interrupt signal at the end of the most recent scan. This leaves both of the pointers SS and SE with valid addresses which bracket the most recent scan. This data is thus immediately available for decoding in accordance with the decoding operations shown in the flow chart of FIG. 7. At this point after block 760, the Microprocessor's operation returns from the End of Scan Interrupt at block 765 and resumes what it was previously doing. It is this interrupt routine in conjunction with block 705 and block 725 of the decoding process which manipulate the memory pointers and embody the loose linkage between the scanning hardware and the decoding routine undertaken by the Microprocessor.

Such decoding routine is used to decode scan data produced by the above described scanning process and will now be described with reference to the flow chart of FIG. 7. Decoding begins with block 700 when the processor waits until scanning is called for by, for example, the pulling of trigger 28. When scanning is called for, the processor at block 705 initializes the SS pointer to an invalid number and sets the SE pointer equal to the DMA pointer which is equal to the beginning address of the top of the first in-first out memory space. After the initialization is completed, the processor at block 710 enables the scanning hardware at block 600 to proceed with acquiring scans. At block 715, the processor again checks to see if scanning is still called for in order to prevent an unnecessary decode cycle. If not, the processor proceeds to block 745 and disables the scanning hardware. When scanning is enabled, the processor at block 720 examines pointer SS to see if it contains a valid address, i.e., to see if there is a block of scan data which is ready to be decoded. When SS pointer is valid, the processor proceeds to block 725 which causes it to set decoding start and end pointers DS and DE to the addresses contained in SS and SE pointers, respectively, which identify the memory space location of the most recent scan data. The processor then sets pointer SS to an invalid value to assure that it does not decode that block of scan data more than once.

Once the processor has completed the above-described steps, it proceeds with decoding, as called for by block 730. If decoding is successful (block 735), the decoded message is output, as called for by block 740, and, if scanning is still being called for by block 715, the processor proceeds to block 720 to commence another decode cycle. If decoding was not successful, no message is output and the processor is looped back to block 715 to see if scanning is still being called for. Since, as explained earlier, scanning takes less time than decoding under heavy decoding loads, there will ordinarily be no operating condition under which the decoder must wait for further valid data. Thus, the operation depicted in the flow charts of FIG. 6 and 7 results in the desired continuous decoding action.

While, for the sake of clarity, the flow charts of FIGS. 6 and 7 illustrate the scanning and decoding operations as proceeding separately and virtually independently, these operations will ordinarily proceed simultaneously (i.e., in parallel) with the scanning operation being undertaken and controlled by hardwired scanning circuitry associated with DMA controller 32 and the enabling of the scanning hardware and decoding operation being undertaken and controlled by microcomputer 30. This is because paralleling of the two operations in this way allows the reader to use its processing resources more efficiently and to use less total program memory space. Because the programming techniques necessary to perform the scanning and decoding operations on a parallel basis are well known to those skilled in the art they will not be described in detail herein.

Figure 8:
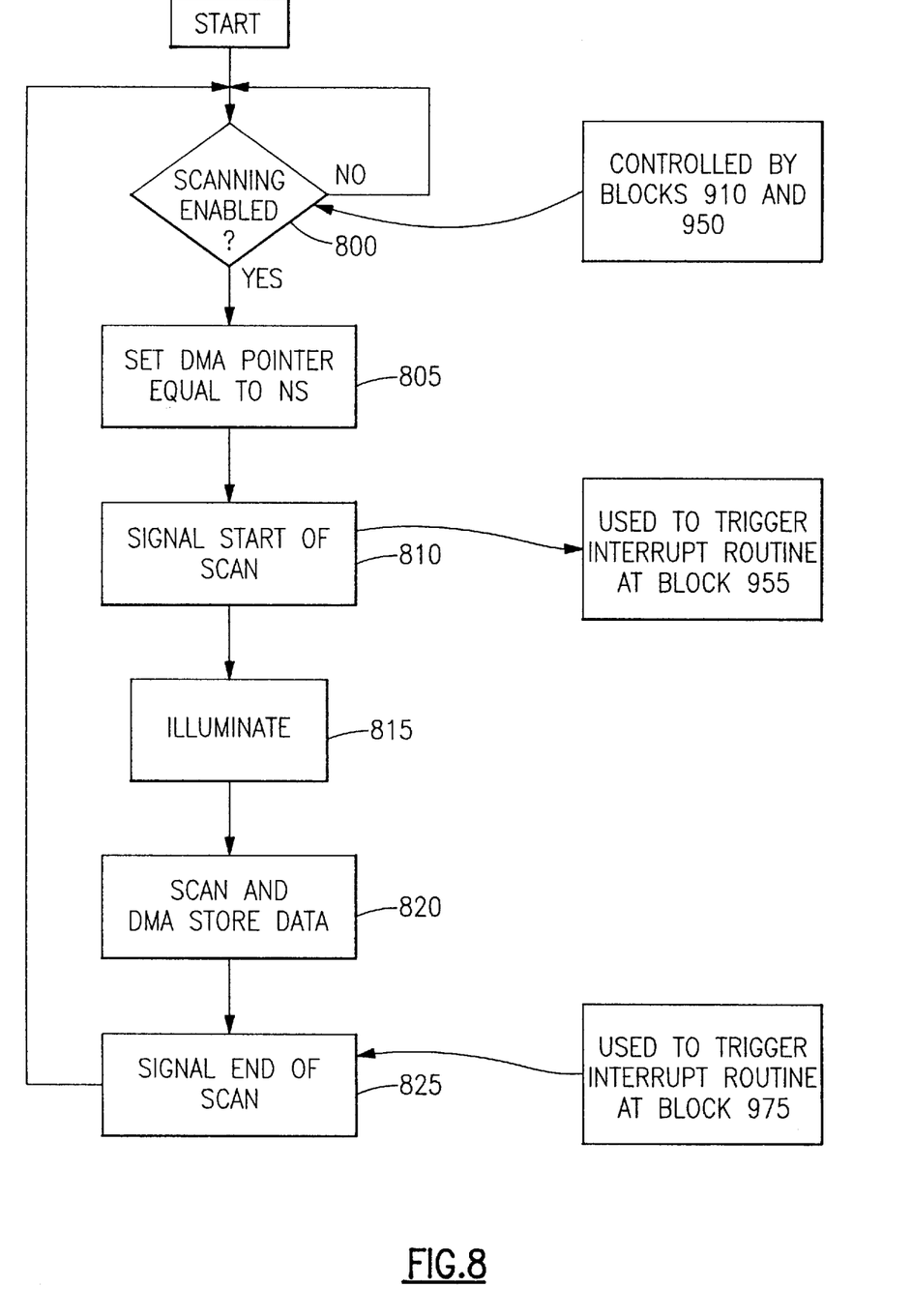
FIGS. 8 and 9 are flow charts illustrating the scanning and decoding phases, respectively, of a second embodiment of the present invention.
Figure 9:
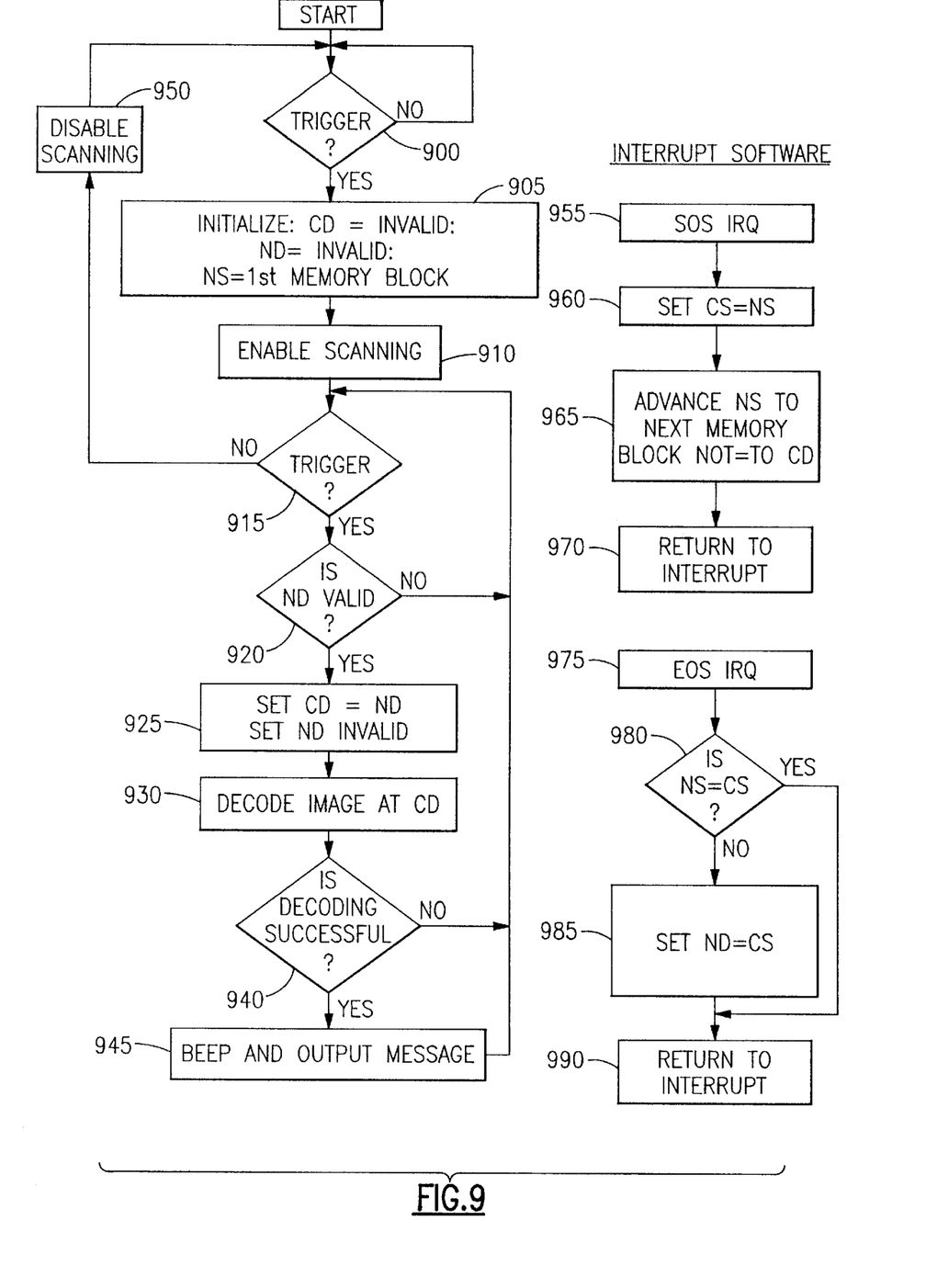

Referring to FIGS. 8 and 9, there are shown flow charts which illustrate the scanning and decoding operations preferably used by the embodiment of FIG. 1A. These processes are made up of a hardware component which operates independently and simultaneously with the Microprocessor to acquire images while the Microprocessor is decoding prior images. Secondly, software interrupt routines are triggered by the scanning hardware to maintain the loose linkage between the hardware and the software of the present embodiment. Turning first to the scanning process shown in FIG. 8, this process begins with block 800, which causes the scanning hardware to test for whether scanning is enabled by the Microprocessor at Blocks 910 and 950. If not, the reader cycles through block 800 and waits. When scanning is enabled, the DMA pointer is loaded with a value from the next scan pointer NS which points to the start address of the memory space where the next scan data block will be stored.

The scanning hardware at block 810 causes a signal, Start of Scan Interrupt, which indicates that a scan is commencing and which is captured by the Microprocessor. The scanning hardware then proceeds to block 810 to illuminate the image. Next, the scanning hardware at block 820 scans the image sensor and stores its contents in the memory space pointed to by NS. After exiting block 820, the hardware causes a signal, End of Scan Interrupt, which indicates that a scan has been completed and which is captured by the Microprocessor. After block 825, the scanning operation loops back to the beginning of the scanning operation at block 800 and proceeds to acquire more images unless disabled by the Microprocessor.

Referring to FIG. 9 when the Start of Scan Interrupt is captured in the Microprocessor at block 955, the Microprocessor halts whatever it is doing. At block 960, the current scan CS pointer is set equal to NS. Pointer CS will now point to the memory space which wilt contain the most recently completed scan. The interrupt routine then proceeds to block 965 where NS is advanced to the next memory space which is not equal to current decode CD pointer which points to the start address of the memory space where the current decoding is to occur. Pointer NS will now point to a memory space where the next scanned image can be stored. At this point after block 965, the Microprocessor operation returns from the Start of Scan Interrupt at block 970 and resumes what it was previously doing.

Again referring to FIG. 9 when the End of Scan Interrupt is captured in the Microprocessor at block 975, the Microprocessor halts whatever it is doing. At block 980, the processor checks to see if NS is equal to CS. If NS is equal to CS, then the Microprocessor resumes what it was doing without setting next decode ND pointer to a valid value. If NS is not equal to CS, ND is set equal to CS at block 985 so the decode routine will have a valid ND pointer and know the memory space which contains the next image to be decoded. At this point after block 985, the Microprocessor operation returns from the End of Scan Interrupt at block 970 and resumes what it was previously doing.

It is the above interrupt routines in conjunction with blocks 905, 925 and 935 of the decoding process which manipulate the memory pointers to inform the decoding routine of the most recent image to decode and embody the loose linkage between the scanning hardware and the decoding routine undertaken by the Microprocessor. These interrupt and memory pointer routines are independent of any memory constraints such that they work equally well with two, three or more memory spaces. Simultaneously and independent of these above functions of the invention, the processor undertakes the decoding of the most recent block of scan data.

Referring now to FIG. 9, there will now be described a decoding process suitable for use with the embodiment of FIG. 1A. The processor begins the decoding routine at block 900 where the processor waits until scanning is called for by, for example, the pulling of trigger 28. When scanning is called for, the processor at block 905 initializes CD to be marked as invalid to prevent decoding from being attempted before a usable image becomes available. Block 905 also sets ND pointer to invalid and NS pointer equal to the first memory space in which the next image is to be stored.

After setting the various pointers, the processor at block 910 enables the scanning hardware at block 800 to proceed with acquiring images. At block 915, the processor again checks to see if scanning is still called for. If not, the processor proceeds to block 950 and disables the scanning hardware. When scanning is enabled, the processor waits at block 920 and examines ND to see if it contains a valid address, i.e., to see if there is an image which is ready to be decoded. This wait interval may correspond to time intervals $T_{s0}$, $T_{s1}$, etc. in FIG. 4D. Once a memory space contains a complete image, the processor at block 925 sets CD pointer equal to ND pointer, thereby informing the decode routine of the memory space location of the most recent image available. The processor at block 930 decodes the image in the memory space pointed to by CD pointer. At the same time, ND is set to an invalid value to prevent the image in the memory space pointed to by ND from being decoded more than once. Once the decode of the image pointed to by CD is complete, the processor sets NS equal to CD and then sets CD invalid at block 935 to free up the memory space which was pointed to by CD such that newly acquired images can be stored therein (see Block 965).

Once decoding is complete, at block 940 a determination is made as to whether decoding was successful. If decoding was successful, the decoded message is output as called for by block 945 and, if scanning is still being called for (block 915), the processor loops back to blocks 915 and 920 to wait to begin another decoding cycle. If decoding was not successful, block 940 causes the processor to loop back for a new decoding cycle without outputting any data message. In either case, if scanning is no longer required, the processor proceeds to block 950 and disables the scanning hardware.

As explained in connection with the embodiment of FIGS. 6 and 7, the showing of the scanning and decoding operations of the embodiment of FIGS. 8 and 9 in separate flow charts does not mean that these operations are performed separately and independently. It will, therefore, be understood that the scanning and decoding operations shown in FIGS. 8 and 9 are preferably performed substantially simultaneously, with the scanning operation being performed by hardwired scanning circuitry associated with DMA controller 32 and the decoding operation being performed by microcomputer 30.

While this invention has been explained with reference to the structure disclosed herein, it is not confined to the details set forth and this application is intended to cover any modifications and changes as may come within the scope of the following claims:

What is claimed is:

1. In a reading apparatus for reading and decoding data encoded in an optically readable indicia, in combination:

scanning means for scanning said indicia and generating blocks of scan data indicative of the results of respective scans, said scanning means being adapted to generate blocks of scan data, repetitively, without substantial interruption, when said scanning means is enabled;

a memory for receiving and storing said blocks of scan data;

memory control means for controlling the storing of said blocks of scan data in said memory, said memory control means serving to repetitively cause said memory to replace earlier generated blocks of scan data with later generated blocks of scan data as they occur;

identifying means for repetitively identifying the stored block of scan data which contains the then most current scan data;

decoding means for decoding the blocks of scan data identified by said identifying means, said decoding means being adapted to decode the block of scan data identified by said identifying means at the same time that said scanning means is generating one or more other blocks of scan data; and means for controlling the scanning activity of said scanning means, the decoding activity of said decoding means, and the identifying activity of said identifying means to maintain a tracking relationship between the scanning activity of said scanning means and the decoding activity of said decoding means, without regard to the amount of time required to complete a decoding attempt.

2. The reading apparatus of claim 1 in which said decoding means comprises a microcomputer for decoding stored scan data in accordance with a stored decoding program, and in which said memory control means comprises a DMA controller for storing scan data in said memory substantially without the participation of said microcomputer.

3. The reading apparatus of claim 1 in which said control means is arranged to cause said decoding means to skip over relatively old blocks of scan data, without attempting to decode the same, when the time required to complete a decoding attempt is longer than the time required to generate a block of scan data.

4. The reading apparatus of claim 1 in which the control means causes the decoding means, upon completing a decoding attempt, to suspend its decoding activity until any then incomplete block of scan data has been completed and stored, and then to resume its decoding activity with reference to that block of scan data.

5. The reading apparatus of claim 1 in which the scanning means includes a 1D image sensor and in which said blocks of scan data are stored in respective ones of a plurality of memory spaces which may have different sizes.

6. The reading apparatus of claim 1 in which the scanning means includes a 2D image sensor, and in which said blocks of scan data are stored in respective ones of a plurality memory spaces which have substantially the same size.

7. The reading apparatus of claim 5 in which said identifying means includes means for pointing to the beginning and ending addresses of the block of scan data which contains the then most current scan data.

8. The reading apparatus of claim 6 in which said identifying means includes means for pointing to the memory space which contains the then most current scan data.

9. The reading apparatus of claim 1 in which said identifying means includes a scan pointer for pointing to the block of scan data which contains the then most current scan data and a decode pointer for pointing to the block of scan data which is to be decoded.

10. The reading apparatus of claim 9 in which said decode pointer is marked invalid as decoding begins to prevent blocks of scan data from being decoded more than once.

11. In a reading apparatus for reading and decoding data encoded in a bar code symbol, in combination:

a memory;

scanning means responsive to a scan enable signal for scanning said symbol and generating blocks of scan data representing the results of respective scans, said scanning means being of the type which operates substantially continuously and cyclically, when enabled by said scan enable signal;

memory control means for repetitively directing said blocks of scan data to said memory; and programmable processing means for:
(i) repetitively identifying the then most recently completed block of scan data;
(ii) repetitively attempting to decode said blocks of scan data, each decoding attempt being arranged to begin with the block of scan data that is identified as then most recently completed, and to proceed simultaneously with the generation of additional blocks of scan data by said scanning means; and
(iii) coordinating said scanning, identifying and decoding operations to maintain a tracking relationship between said scanning and said decoding operations, without regard to the heaviness of the decoding load to which said reading apparatus is exposed.

12. The reading apparatus of claim 11 in which said programmable processing means comprises a microcomputer for decoding stored blocks of scan data in accordance with a stored decoding program, and in which said memory control means comprises a DMA controller for storing scan data without the substantial participation of said microcomputer.

13. The reading apparatus of claim 11 in which said programmable processing means is arranged to skip over relatively old blocks of scan data, without attempting to decode the same, when said decoding load is too heavy to allow a one-to-one correspondence to be maintained between scanning and decoding.

14. The reading apparatus of claim 11 in which the programmable processing means is adapted, upon completing a decoding attempt, to suspend decoding until any then incomplete block of scan data has been completed and stored, and then to resume decoding with reference to that block of scan data.

15. The reading apparatus of claim 11 in which the scanning means includes a 1D image sensor and in which said blocks of scan data may have different sizes.

16. The reading apparatus of claim 11 in which the scanning means includes a 2D image sensor, and in which said blocks of scan data have substantially the same size and are stored in respective memory spaces having substantially the same size.

17. The reading apparatus of claim 15 in which said programmable processing means uses pointers for pointing to the beginning and end of said most recently stored complete block of scan data.

18. The reading apparatus of claim 16 in which said programmable processing means uses pointers for pointing to the memory space that contains said most recently stored complete block of scan data.

19. The reading apparatus of claim 11 in which said programmable processing means uses a scan pointer for pointing to the most recently stored complete block of scan data and a decode pointer for pointing to the block of scan data which is to be decoded.

20. The reading apparatus of claim 19 in which said decode pointer is marked invalid as decoding begins to prevent blocks of scan data from being decoded more than one.

21. A method for reading and decoding an optically readable indicia, including the steps of:

providing a memory;

scanning blocks of scan data from said indicia, one after another, without substantial interruption, while scanning is enabled;

repetitively storing said blocks of scan data in said memory, so that later scanned blocks of scan data replace earlier stored blocks of scan data;

repetitively identifying the most recently scanned block of scan data;

repetitively attempting to decode the blocks of scan data identified during said identifying steps, said attempts to decode occurring simultaneously with the performance of additional scanning steps; and controlling said scanning, identifying and decoding steps to maintain a tracking relationship between said scanning and decoding steps, without regard to the amount of time required to complete said attempts to decode.

22. The method of claim 21 including the further steps of providing a direct memory access device, and using said direct memory access device to perform said storing steps.

23. The method of claim 21 in which said controlling step includes the step of skipping over relatively old blocks of scan data, without making an attempt to decode the same, when the time required to complete a decoding attempt is relatively large in relation to the time required to complete a scanning step.

24. The method of claim 21 in which the beginning of one decoding attempt is separated from the end of the prior decoding attempt by a time sufficient to allow the completion of the scanning step which is in progress at the time of said end.

25. The method of claim 22 in which said decoding step includes the step of storing the information necessary to identify the block of scan data to be decoded, and then marking the information stored during said storing step as invalid.

26. A method for reading and decoding data from a bar code symbol, including the steps of:

providing a memory;

repeatedly scanning said symbol and generating blocks of data representing the results of respective scannings;

repeatedly storing said blocks of data in said memory, later generated blocks of data being written over earlier generated blocks of data as necessary;

repeatedly indicating the location of the then most recently stored one of said blocks;

repeatedly attempting to decode the blocks of data indicated by said indicating steps; and coordinating said scanning, indicating, and decoding steps so that said scanning and decoding steps each proceed approximately simultaneously and continuously.

27. The method of claim 26 including the further steps of providing a DMA controller, and using said DMA controller to perform said storing steps.

28. The method of claim 26 in which a tracking relationship is maintained between said scanning steps and said decoding steps.

29. The method of claim 28 in which said tracking relationship is one in which the beginning of one decoding attempt is separated from the end of the prior decoding attempt by a time sufficient to allow the completion of the scanning step which is in progress at the time of said end.

30. The method of claim 28 in which said tracking relationship is one in which relatively old ones of said stored blocks are skipped over, without making an attempt to decode the same, when the method is practiced under conditions in which:

(i) decoding takes significantly longer than scanning; and (ii) the size of said memory is insufficient to allow an attempt to decode relatively old ones of said stored blocks before they are written over.

31. The method of claim 26 in which said decoding step includes the steps of storing the information necessary to identify said most recently stored block, and then marking said information with an indication that said information is invalid.

* * * * *